(12) United States Patent
Kang et al.

(10) Patent No.: US 11,979,574 B2
(45) Date of Patent: *May 7, 2024

(54) METHOD AND APPARATUS FOR CONTROLLING CODING TOOLS

(71) Applicants: Hyundai Motor Company, Seoul (KR); Kia Corporation, Seoul (KR); Ewha University-Industry Collaboration Foundation, Seoul (KR)

(72) Inventors: Je Won Kang, Seoul (KR); Sang Hyo Park, Seoul (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Ewha University-Industry Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,507

(22) Filed: Oct. 12, 2022

(65) Prior Publication Data

US 2023/0029682 A1 Feb. 2, 2023

Related U.S. Application Data

(63) Continuation of application No. 17/286,798, filed as application No. PCT/KR2020/008045 on Jun. 22, 2020, now Pat. No. 11,516,472.

(30) Foreign Application Priority Data

Jun. 21, 2019 (KR) .................. 10-2019-0074231
Jul. 2, 2019 (KR) .................. 10-2019-0079652
Jun. 22, 2020 (KR) .................. 10-2020-0075560

(51) Int. Cl.
H04N 19/127 (2014.01)
H04N 19/103 (2014.01)
(Continued)

(52) U.S. Cl.
CPC ......... *H04N 19/127* (2014.11); *H04N 19/103* (2014.11); *H04N 19/13* (2014.11);
(Continued)

(58) Field of Classification Search
CPC .... H04N 19/127; H04N 19/103; H04N 19/13; H04N 19/132; H04N 19/136;
(Continued)

(56) References Cited

U.S. PATENT DOCUMENTS 6,184,712 B1   2/2001  Wittig et al.
10,148,907 B1  12/2018 Wu et al.
(Continued)

FOREIGN PATENT DOCUMENTS

CN   104185991 A   12/2014
CN   104471943 A    3/2015
(Continued)

OTHER PUBLICATIONS

Bross, B. et al., "Versatile Video Coding Submitted at the time of filing", 3 pages.
(Continued)

*Primary Examiner* — Tracy Y. Li
(74) *Attorney, Agent, or Firm* — Fox Rothschild LLP

(57) ABSTRACT

A method and device for controlling coding tools are provided. The video decoding method includes decoding, from a high level of a bitstream, an enable flag indicating whether one or more coding tools are enabled. The coding tools includes a first coding tool that encodes sample values using luma component mapping based on a piecewise linear model. The method includes acquiring a value of an appli- (Continued)

cation flag depending on a value of the enable flag, by setting the application flag indicating whether to apply the coding tools to a predetermined value, or by decoding the application flag from a low level of the bitstream, the application flag including a first application flag indicating whether to apply the first coding tool. The coding tools are operated when the value of the application flag is a value indicating that the coding tools are applied.

6 Claims, 13 Drawing Sheets

(51) Int. Cl.
  *H04N 19/13* (2014.01)
  *H04N 19/132* (2014.01)
  *H04N 19/136* (2014.01)
  *H04N 19/184* (2014.01)
  *H04N 19/186* (2014.01)
  *H04N 19/187* (2014.01)

(52) U.S. Cl.
  CPC ......... *H04N 19/132* (2014.11); *H04N 19/136* (2014.11); *H04N 19/184* (2014.11); *H04N 19/186* (2014.11); *H04N 19/187* (2014.11)

(58) Field of Classification Search
  CPC .. H04N 19/184; H04N 19/186; H04N 19/187; H04N 19/105; H04N 19/12; H04N 19/126; H04N 19/176; H04N 19/593; H04N 19/70
  See application file for complete search history.

(56) References Cited

U.S. PATENT DOCUMENTS

| | | | |
|---|---|---|---|
| 2014/0022343 A1 | 1/2014 | Chen | |
| 2014/0029670 A1 | 1/2014 | Kung et al. | |
| 2014/0241418 A1 | 8/2014 | Garbas et al. | |
| 2018/0176601 A1 | 6/2018 | Jeong et al. | |
| 2020/0027386 A1 | 1/2020 | Wang et al. | |
| 2020/0288159 A1* | 9/2020 | Van der Auwera | H04N 19/186 |
| 2022/0030257 A1* | 1/2022 | Deng | H04N 19/105 |
| 2022/0078424 A1* | 3/2022 | Zhang | H04N 19/70 |

FOREIGN PATENT DOCUMENTS

| | | |
|---|---|---|
| CN | 104685874 A | 6/2015 |
| CN | 104782125 A | 7/2015 |
| CN | 107025880 A | 8/2017 |
| CN | 107925773 A | 4/2018 |
| KR | 2015-0036599 A | 4/2015 |
| KR | 101600056 B1 | 3/2016 |
| KR | 2016-0096181 A | 8/2016 |
| WO | 2014/071439 A1 | 5/2014 |
| WO | 2019-006300 A1 | 1/2019 |

OTHER PUBLICATIONS

Lu, T. et al., AHG16: Simplification of Reshaper Implementation, Joint Video Experts Team (JVET) of ITU-T SG 16 WO 3 and ISO/IEC JTC 1/SC 29/WG 11, 14th Meeting: Geneva, CH, Mar. 19-17, 2019, 10 pages.

Lu, T. et al., CE12: Mapping functions (test CE12-1 and CE12-2), Joint Video Experts Team (JVET) of ITU-T SG 16 WP 3 and ISO/IEC JTC 1/SC 29/WG 11, 13th Meeting: Marrakech, MA, Jan. 9-18, 2019, 17 pages.

Office Action for Chinese Patent Application No. 2020800451512 from China National Intellectual Property Administration, dated Nov. 13, 2023, 53 pages.

Chen, J. et al., Algorithm description for Versatile Video Coding and Test Model 5 (VTM 5), 3 pages.

* cited by examiner

METHOD AND APPARATUS FOR CONTROLLING CODING TOOLS

CROSS-REFERENCE TO RELATED APPLICATION

This Application is a Continuation of application Ser. No. 17/286,798 filed on Apr. 19, 2021, which is incorporated herein by reference in its entirety. Application Ser. No. 17/286,798 is a National Phase application filed under 35 USC 371 of PCT International Application No. PCT/KR2020/008045, with an International Filing Date of Jun. 22, 2020, which claims priority to Korean Patent Application No. 10-2019-0074231 filed on Jun. 21, 2019, Korean Patent Application No. 10-2019-0079652 filed on Jul. 2, 2019, and Korean Patent Application No. 10-2020-0075560 filed on Jun. 22, 2020, which are incorporated herein by reference in their entirety.

TECHNICAL FIELD

The present disclosure relates to encoding and decoding of a video, and more particularly, to a method and apparatus for improving the efficiency of encoding and decoding by organically controlling various coding tools for encoding and decoding of a video.

BACKGROUND ART

Since the volume of video data is larger than that of voice data or still image data, storing or transmitting video data without processing for compression requires a lot of hardware resources including memory. Accordingly, in storing or transmitting video data, the video data is generally compressed using an encoder to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

In order to meet these needs, the present disclosure aims to provide an improved video encoding and decoding technology. In particular, one aspect of the present disclosure relates to a technique for improving the efficiency of encoding and decoding by controlling On or Off of various coding tools through a syntax element defined at a high level.

In accordance with one aspect of the present disclosure, provided is a video decoding method including decoding, from a high level of a bitstream, an enable flag indicating whether one or more coding tools are enabled, the one or more coding tools comprising a first coding tool configured to encode sample values using luma component mapping based on a piecewise linear model; acquiring a value of an application flag depending on a value of the enable flag, by setting the application flag indicating whether to apply the one or more coding tools to a predetermined value or by decoding the application flag from a low level of the bitstream, the application flag comprising a first application flag indicating whether to apply the first coding tool; and when the value of the application flag is a value indicating that the one or more coding tools are applied, executing the one or more coding tools.

When the first coding tool is executed according to a value of the first application flag, the executing of the one or more coding tools includes: generating a mapped luma prediction sample from a luma prediction sample based on a piecewise linear model corresponding to the luma prediction sample, and generating a luma reconstructed sample by adding a luma residual sample reconstructed from the bitstream and the mapped luma prediction sample; and reversely mapping the luma reconstructed sample using an inverse piecewise linear model having an inverse relationship with the piecewise linear model.

In accordance with another aspect of the present disclosure, provided is a video decoding apparatus including an entropy decoder configured to decode, from a high level of a bitstream, an enable flag indicating whether one or more coding tools are enabled, the one or more coding tools including a first coding tool configured to encode a sample value using luma component mapping based on a piecewise linear model; an acquisition unit configured to acquire a value of an application flag indicating whether to apply the one or more coding tools, by, according to a value of the enable flag, setting the application flag to a predetermined value or decoding the same from a low level of the bitstream, wherein the application flag includes a first application flag indicating whether to apply the first coding tool; and an execution unit configured to execute the one or more coding tools when the value of the application flag is a value indicating that the one or more coding tools are applied.

When the first coding tool is executed according to a value of the first application flag, the execution unit configured to: generate a mapped luma prediction sample from a luma prediction sample based on a piecewise linear model corresponding to the luma prediction sample; generate a luma reconstructed sample by adding a luma residual sample reconstructed from the bitstream and the mapped luma prediction sample; and reversely map the luma reconstructed sample using an inverse piecewise linear model having an inverse relationship with the piecewise linear model.

As is apparent from the foregoing, according to an exemplary embodiment of the present disclosure, whether to apply various coding tools may be controlled at a high level, and therefore compression performance in encoding and decoding may be improved.

DETAILED DESCRIPTION

Figure 1:
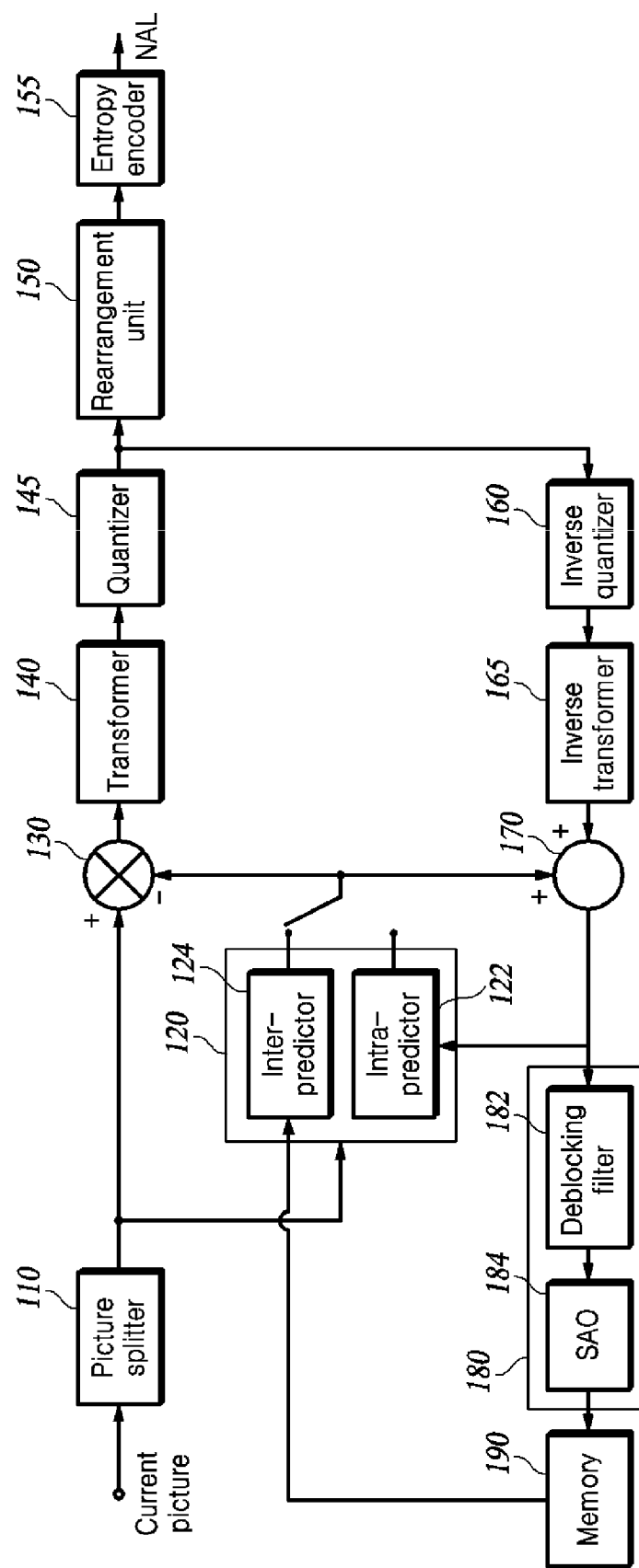
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190. Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles or/and slices. In particular, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 is configured to determine the size of a coding tree unit (CTU). Information about the size of the CTU (CTU size) is encoded as a syntax of the SPS or PPS and is transmitted to the video decoding apparatus. The picture splitter 110 is configured to split each picture constituting the video into a plurality of CTUs having a predetermined size, and then recursively split the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes having a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. In particular, BTTT may be collectively referred to as a multiple-type tree (MTT).

Figure 2:
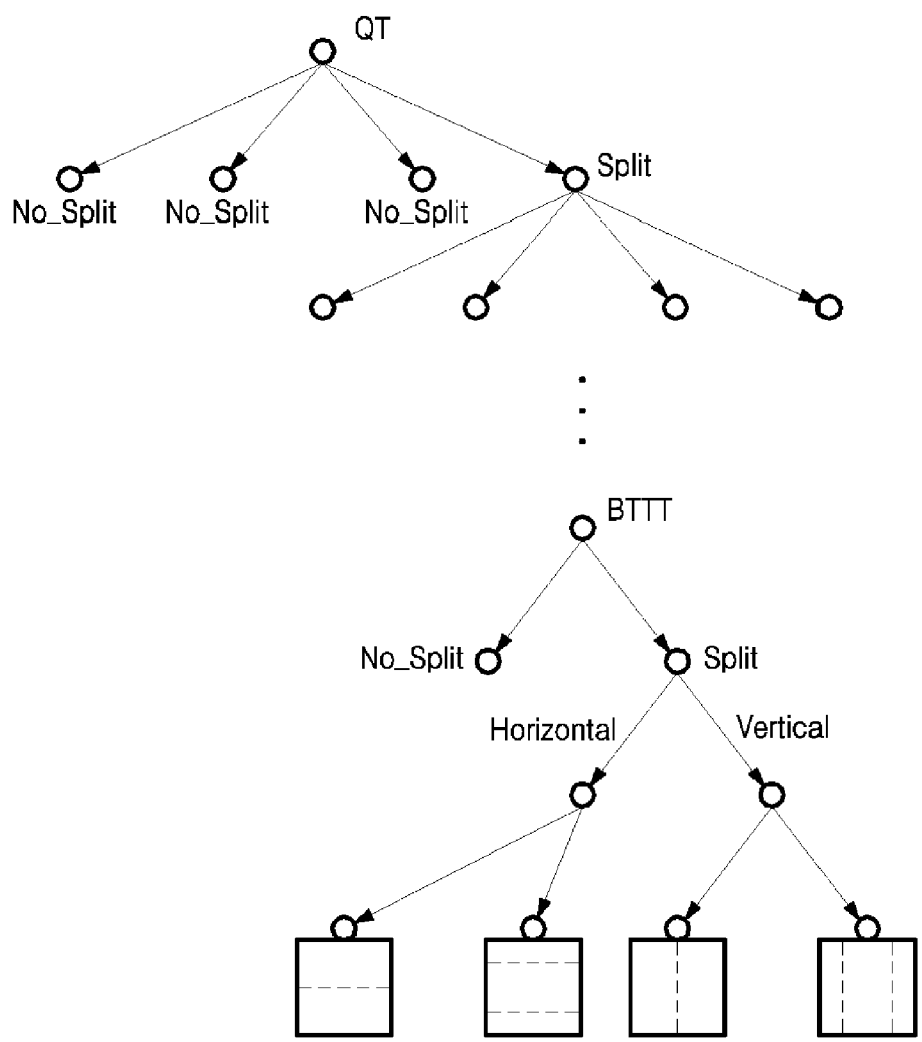
FIG. 2 exemplarily shows block partitioning structure using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus.

When the leaf node of the QT is equal to or less than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus.

Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular. The predictor 120 is configured to predict the current block to generate a prediction block. The predictor 120 includes an intra-predictor 122 and an inter-predictor 124.

In general, each of the current blocks in a picture may be predictively coded. In addition, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

Figure 3A:
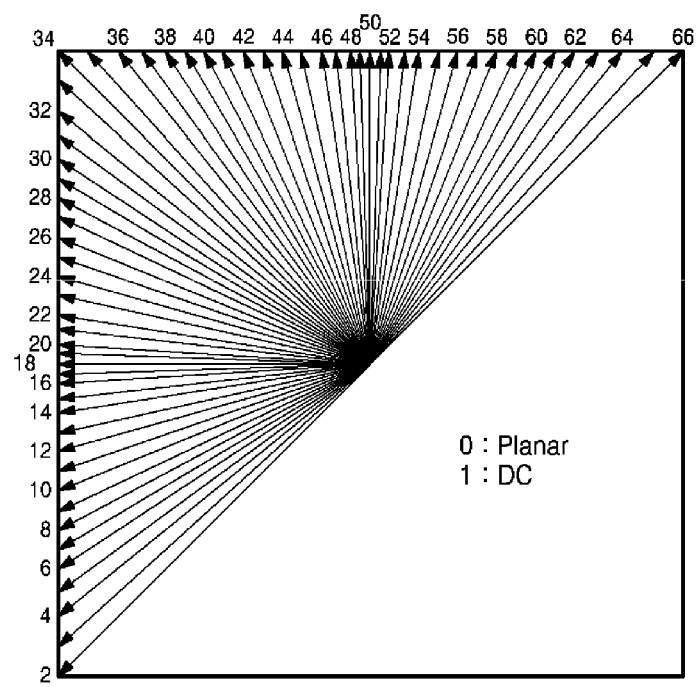
FIG. 3A exemplarily shows a plurality of intra-prediction modes.

The intra-prediction unit 122 is configured to predict pixels in the current block using pixels (reference pixels) positioned around the current block in the current picture including the current block. There are a plurality of intra-prediction modes according to the prediction directions. For example, as shown in FIG. 3A, the plurality of intra-prediction modes may include two non-directional modes, which include a planar mode and a direct current (DC) mode, and 65 directional modes. Neighboring pixels and an equation to be used are defined differently for each prediction mode. The table below lists intra-prediction mode numbers and names thereof.

Figure 3B:
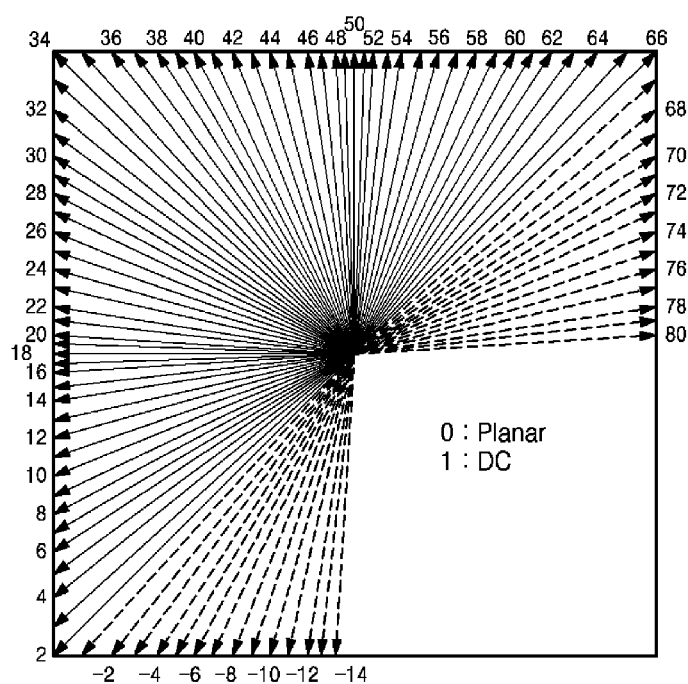
FIG. 3B exemplarily shows a plurality of intra prediction modes including wide-angle intra prediction modes.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape.

In particular, among the wide angle intra-prediction modes, some wide angle intra-prediction modes available for the current block may be determined based on a ratio of the width and height of the rectangular current block. For example, wide angle intra-prediction modes with an angle less than about 45 degrees (intra prediction modes 67 to 80) may be used when the current block has a rectangular shape with a height less than the width thereof. Wide angle intra-prediction modes with an angle greater than about −135 degrees (intra-prediction modes −1 to −14) may be used when the current block has a rectangular shape with height greater than the width thereof.

The intra-predictor 122 may be configured to determine an intra-prediction mode to be used in encoding the current block. In some examples, the intra-predictor 122 may be configured to encode the current block using several intra-prediction modes and select an appropriate intra-prediction mode to use from the tested modes. For example, the intra-predictor 122 may be configured to calculate rate distortion values using rate-distortion analysis of several tested intra-prediction modes, and select an intra-prediction mode that has the best rate distortion characteristics among the tested modes.

The intra-predictor 122 is configured to select one intra-prediction mode from among the plurality of intra-prediction modes, and predict the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 is configured to generate a prediction block for the current block through motion compensation. The inter-predictor 124 is configured to search for a block most similar to the current block in a reference picture which has been encoded and decoded earlier than the current picture, and generate a prediction block for the current block using the searched block. Then, the inter-predictor is configured to generate a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The subtractor 130 is configured to subtract the prediction block generated by the intra-predictor 122 or the inter-predictor 124 from the current block to generate a residual block. The transformer 140 may be configured to split the residual block into one or more transform blocks, and apply the transformation to the one or more transform blocks, thereby transforming the residual values of the transform blocks from the pixel domain to the frequency domain. In the frequency domain, the transformed blocks are referred to as coefficient blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may be configured to transform residual signals in the residual block using the entire size of the residual block as a transformation unit. In addition, the transformer 140 may be configured to partition the residual block into two sub-blocks in a horizontal or vertical direction, and transform only one of the two sub-blocks. Accordingly, the size of the transform block may be different from the size of the residual block (and thus the size of the prediction block). Non-zero residual sample values may not be present or may be very rare in the untransformed sub-block. The residual samples of the untransformed subblock are not signaled, and may be regarded as "0" by the video decoding apparatus. There may be multiple partition types according to the partitioning direction and partitioning ratio.

The transformer 140 may be configured to provide information about the coding mode (or transform mode) of the residual block (e.g., information indicating whether the residual block is transformed or the residual subblock is transformed, and information indicating the partition type selected to partition the residual block into subblocks, and information identifying a subblock that is transformed is performed) to the entropy encoder 155. The entropy encoder 155 may be configured to encode the information about the coding mode (or transform mode) of the residual block. The quantizer 145 may be configured to quantize transform coefficients output from the transformer 140, and output the quantized transform coefficients to the entropy encoder 155. For some blocks or frames, the quantizer 145 may be configured to directly quantize a related residual block without transformation.

The rearrangement unit 150 may be configured to rearrange the coefficient values for the quantized residual value. Additionally, the rearrangement unit 150 may be configured to change the 2-dimensional array of coefficients into a 1-dimensional coefficient sequence through coefficient scanning. For example, the rearrangement unit 150 may be configured to scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan and the horizontal scan according to the size of the transformation unit and the intra-prediction mode.

The entropy encoder 155 is configured to encode the one-dimensional quantized transform coefficients output from the rearrangement unit 150 using uses various encoding techniques such as Context-based Adaptive Binary Arithmetic Code (CABAC) and exponential Golomb, to generate a bitstream. The entropy encoder 155 is configured to encode information such as a CTU size, a CU split flag, a QT_split_flag, an MTT splitting type, and an MTT splitting direction, which are associated with block splitting, such that the video decoding apparatus may split the block in the same manner as in the video encoding apparatus. In addition, the entropy encoder 155 is configured to encode information about a prediction type indicating whether the current block is encoded by intra-prediction or inter-prediction, and encode intra-prediction information (i.e., information about an intra-prediction mode) or inter-prediction information (information about a reference picture index and a motion vector) according to the prediction type.

The inverse quantizer 160 may be configured to inversely quantize the quantized transform coefficients output from the quantizer 145 to generate transform coefficients. The inverse transformer 165 is configured to transform the transform coefficients output from the inverse quantizer 160 from the frequency domain to the spatial domain and reconstruct the residual block. The adder 170 is configured to add the reconstructed residual block to the prediction block generated by the predictor 120 to reconstruct the current block. The pixels in the reconstructed current block are used as reference pixels in performing intra-prediction of a next block.

The filter unit 180 is configured to filter the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184. The deblocking filter 180 is configured to filter the boundary between the reconstructed blocks to remove blocking artifacts caused by block-by-block coding/decoding, and the SAO filter 184 is configured to perform additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
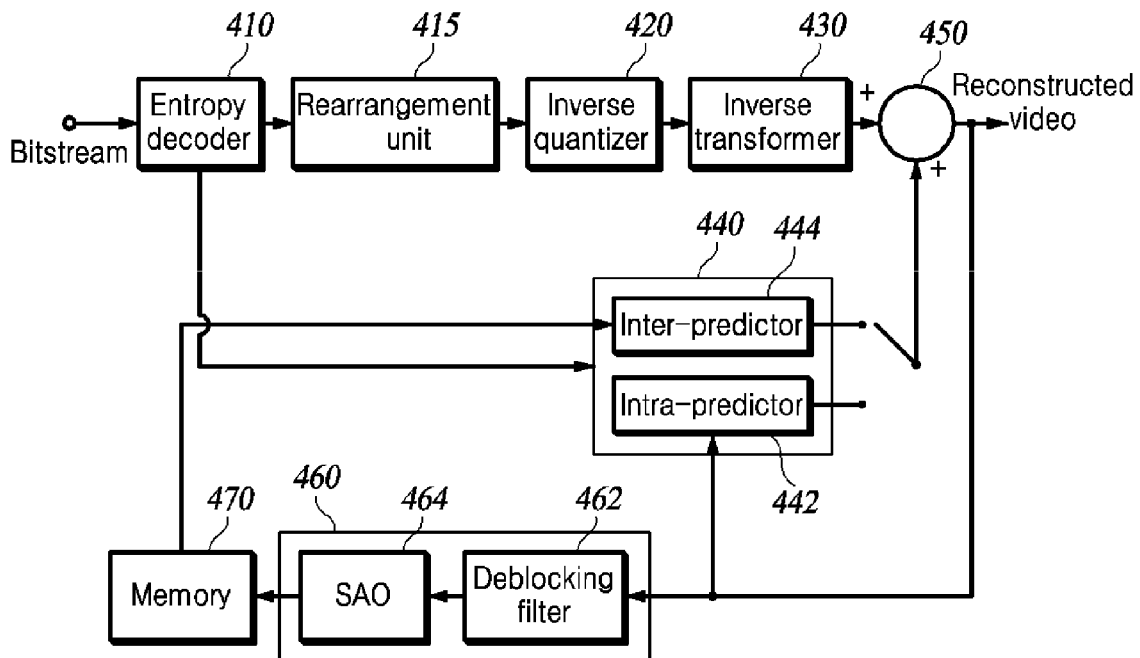
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include an entropy decoder 410, a rearrangement unit 415, an inverse quantizer 420, an inverse transformer 430, a predictor 440, an adder 450, a filter unit 460, and a memory 470. Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 is configured to determine a current block to be decoded by decoding a bitstream generated by the video encoding apparatus and extracting information related to block splitting, and extract prediction information and information about a residual signal, and the like required to reconstruct the current block. The entropy decoder 410 is configured to extract information about the CTU size from the sequence parameter set (SPS) or the picture parameter set (PPS), determine the size of the CTU, and split a picture into CTUs of the determined size. Then, the decoder is configured to determine the CTU as the uppermost layer, that is, the root node of a tree structure, and extract splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times. As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 is configured to extract information about a prediction type indicating whether the current block is intra-predicted or inter-predicted. When the prediction type information indicates intra-prediction, the entropy decoder 410 is configured to extract a syntax element for the intra-prediction information (intra-prediction mode) for the current block. When the prediction type information indicates inter-prediction, the entropy decoder 410 is configured to extract a syntax element for the inter-prediction information, that is, information indicating a motion vector and a reference picture referred to by the motion vector.

The entropy decoder 410 is configured to extract information about the coding mode of the residual block (e.g., information about whether the residual block is encoded only a subblock of the residual block is encoded, information indicating the partition type selected to partition the residual block into subblocks, information identifying the encoded residual subblock, quantization parameters, etc.) from the bitstream. The entropy decoder 410 is also configured to extract information about quantized transform coefficients of the current block as information about the residual signal.

The rearrangement unit 415 may be configured to change the sequence of the one-dimensional quantized transform coefficients entropy-decoded by the entropy decoder 410 to a 2-dimensional coefficient array (i.e., block) in a reverse order of the coefficient scanning performed by the video encoding apparatus. The inverse quantizer 420 is configured to inversely quantize the quantized transform coefficients. The inverse transformer 430 is configured to inversely transform the inversely quantized transform coefficients from the frequency domain to the spatial domain based on information about the coding mode of the residual block to reconstruct residual signals, thereby generating a reconstructed residual block for the current block When the information about the coding mode of the residual block indicates that the residual block of the current block has been coded by the video encoding apparatus, the inverse transformer 430 uses the size of the current block (and thus the size of the residual block to be reconstructed) as a transform unit for the inverse quantized transform coefficients to perform inverse transform to generate a reconstructed residual block for the current block.

When the information about the coding mode of the residual block indicates that only one subblock of the residual block has been coded by the video encoding apparatus, the inverse transformer 430 uses the size of the transformed subblock as a transform unit for the inverse quantized transform coefficients to perform inverse transform to reconstruct the residual signals for the transformed subblock, and fills the residual signals for the untransformed subblock with a value of "0" to generate a reconstructed residual block for the current block.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction. The intra-predictor 442 is configured to determine an intra-prediction mode of the current block among a plurality of intra-prediction modes based on the syntax element for the intra-prediction mode extracted from the entropy decoder 410, and predict the current block using the reference pixels around the current block according to the intra-prediction mode.

The inter-predictor 444 is configured to determine a motion vector of the current block and a reference picture referred to by the motion vector using the syntax element for the intra-prediction mode extracted from the entropy decoder 410, and predict the current block based on the motion vector and the reference picture. The adder 450 is configured to reconstruct the current block by adding the residual block output from the inverse transformer 430 and the prediction block output from the inter-predictor 444 or the intra-predictor 442. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 is configured to perform additional filtering on the reconstructed block after deblocking filtering to corresponding offsets to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

In the present disclosure, a method of controlling various coding tools (i.e., coding tool control methods) is proposed. The coding tools operated according to the method of the present disclosure may include a coding tool configured to skip a transform/inverse transform operation for residual samples, a coding tool configured to selectively apply one or more of various transform kernels to residual samples to which a transform operation is applied, a coding tool configured to acquire prediction information for a current block from another block located in a current picture containing the current block, a coding tool (a first coding tool) configured to map prediction samples and scale residual samples using a piece-wise linear model, and a coding tool (a second coding tool) configured to apply differential coding to residual samples.

Hereinafter, coding tools operated according to the method of the present disclosure will be referred to as "target coding tools." The target coding tools may correspond to coding tools for screen content coding (SCC). Operating a target coding tool may refer to enabling/disabling the target coding tool. In addition, operating the target coding tool may refer to turning on or off the target coding tool. The operation of the target coding tool may be performed on every combination or group of one or more coding tools included in the target coding tool.

Whether to enable/disable a target coding tool and whether to turn on/off the same may be controlled using an enable flag defined at a high level of a bitstream. The enable flag may indicate whether to enable the target coding tool, or may indicate whether SCC is applied to a target image to be encoded/decode. The latter case is provided in consideration that the "coding tool configured to skip the transform/inverse transform operation for the residual sample" and the "coding tool configured to acquire prediction information about a current block from another block located in a current picture containing the current block" may be applied with a high probability when the characteristics of a video are screen content. In addition, the latter case is provided in consideration that the "coding tool configured to selectively apply one or more of various transform kernels to residual samples to which a transform operation is applied" may be applied with a high probability when the characteristics of a video are not screen content.

In the following, whether to enable the target coding tool and whether to apply the SCC to the target coding tool will be collectively expressed as "whether to enable the target coding tool." The high level of the bitstream, in which the enable flag is defined, represents a higher level than other levels (low levels) in the bitstream described below. The high level may be an SPS level, a PPS level, a picture level (including a picture header), a slice level (including a slice header), a tile level (including a tile header), a brick level, or the like.

Figure 5:
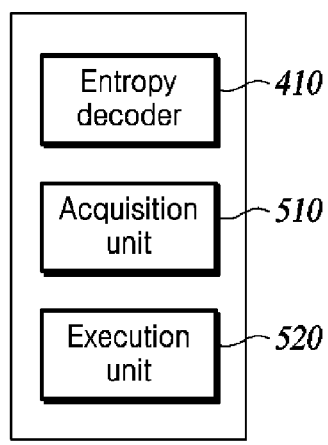
FIG. 5 is an exemplary block diagram of a video decoding apparatus capable of controlling coding tools.
Figure 6:
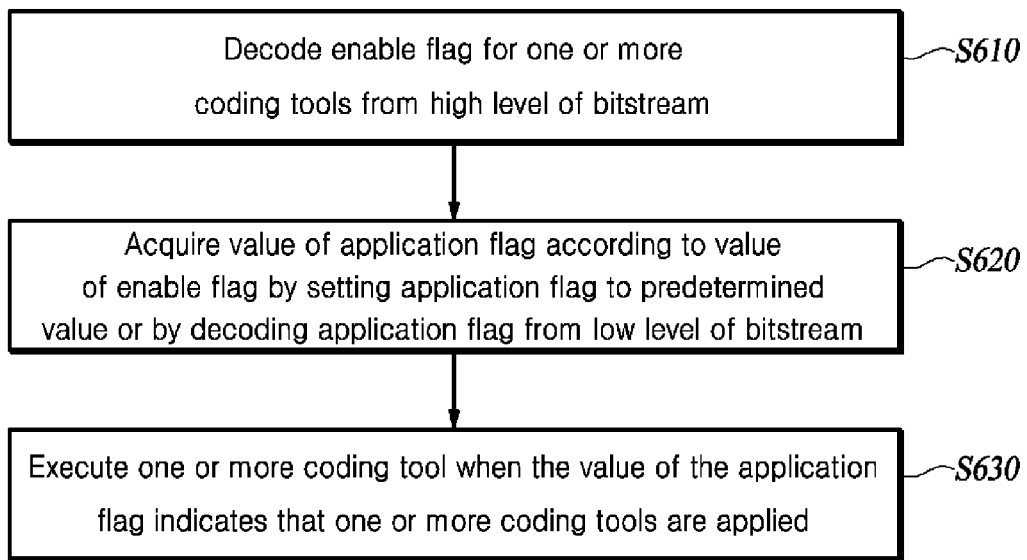
FIG. 6 is a flowchart illustrating an example of a method of controlling coding tools.

FIG. 5 shows an exemplary block diagram of a video decoding apparatus capable of controlling a target coding tool using the enable flag, and FIG. 6 shows a flowchart illustrating an example of the method of controlling a target coding tool. As shown in FIG. 5, the video decoding apparatus may include an entropy decoder 410, an acquisition unit 510, and an execution unit 520.

The video encoding apparatus may be configured to determine whether to enable one or more of the target coding tools, and set a value of the enable flag in accordance with the result. In addition, the video encoding apparatus may be configured to encode the enable flag in the high level of the bitstream to signal the same to the video decoding apparatus. The enable flag equal to 1 indicates that the target coding tool is enabled, and the enable flag equal to 0 indicates that the target coding tool is not enabled. The entropy decoder 410 may be configured to decode the enable flag from the high level of the bitstream (S610).

The video encoding apparatus may be configured to determine whether to apply or execute the target coding tool. In addition, the video encoding apparatus may be configured to determine whether to signal an application flag indicating whether to apply or execute the target coding tool, based on the value of the enable flag. For example, when the enable flag is equal to 1, the application flag may not be signaled. When the enable flag is equal to 0, the application flag may be encoded and signaled to the video decoding apparatus in the low level of the bitstream. As another example, when the enable flag is equal to 1, the application flag may be encoded and signaled to the video decoding apparatus in the low level of the bitstream. When the enable flag is equal to 0, the application flag may not be signaled. The application flag equal to 1 indicates that the target coding tool is applied, and the application flag equal to 0 indicates that the target coding tool is not applied.

The application flag may indicate whether to apply to the entirety of coding tools included in the target coding tools, or may indicate whether to apply one or more of the coding tools included in the target coding tools. In the latter case, the application flag may be divided into a first application flag indicating whether to apply the first coding tool and a second application flag indicating whether to apply the second coding tool.

The acquisition unit 510 may be configured to set the application flag to a predetermined value or may acquire the value of the application flag by decoding the application flag from the low level of the bitstream, depending on the value of the enable flag (S620). For example, when the enable flag is equal to 1, the application flag may be implicitly set to 1. When the enable flag is equal to 0, the application flag may be decoded from a low level of the bitstream. As another example, when the enable flag is equal to 1, the application flag may be decoded from a low level of the bitstream. When the enable flag is equal to 0, the value of the application flag may be implicitly set to 0.

The video encoding apparatus may be configured to encode an encoding target by executing the target coding tool when the target coding tool is applied, but may not execute the target coding tool when the target coding tool is not applied. The execution unit 520 may be configured to execute the target coding tool when the acquired value of the application flag indicates that the target coding tool is applied, and not execute the target coding tool when the acquired value of the application flag indicates the target coding tool is not applied (S630).

Figure 7:
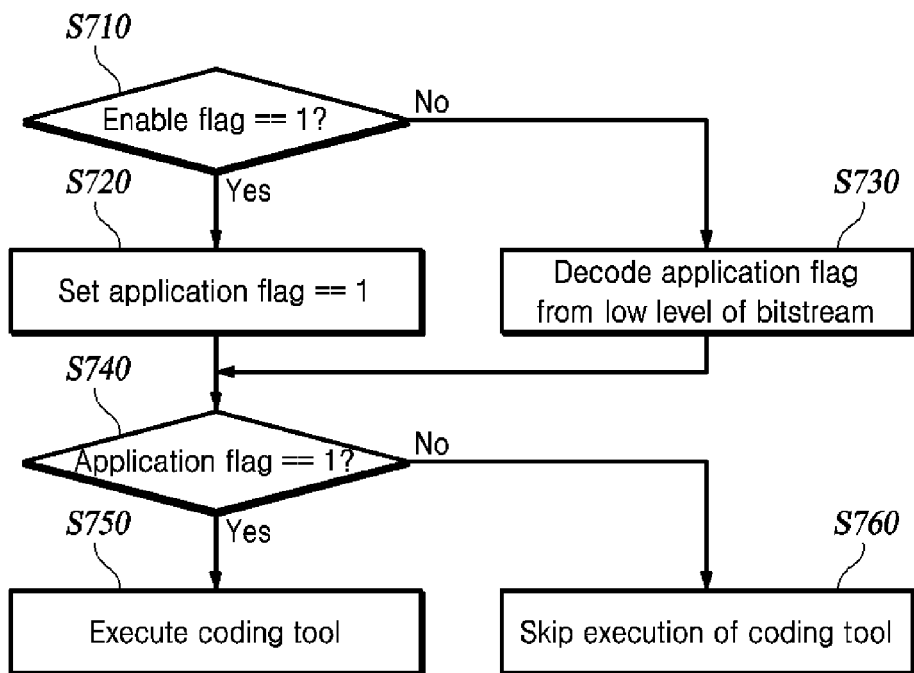
FIGS. 7 and 8 are flowcharts illustrating various examples of a method of controlling coding tools.
Figure 8:
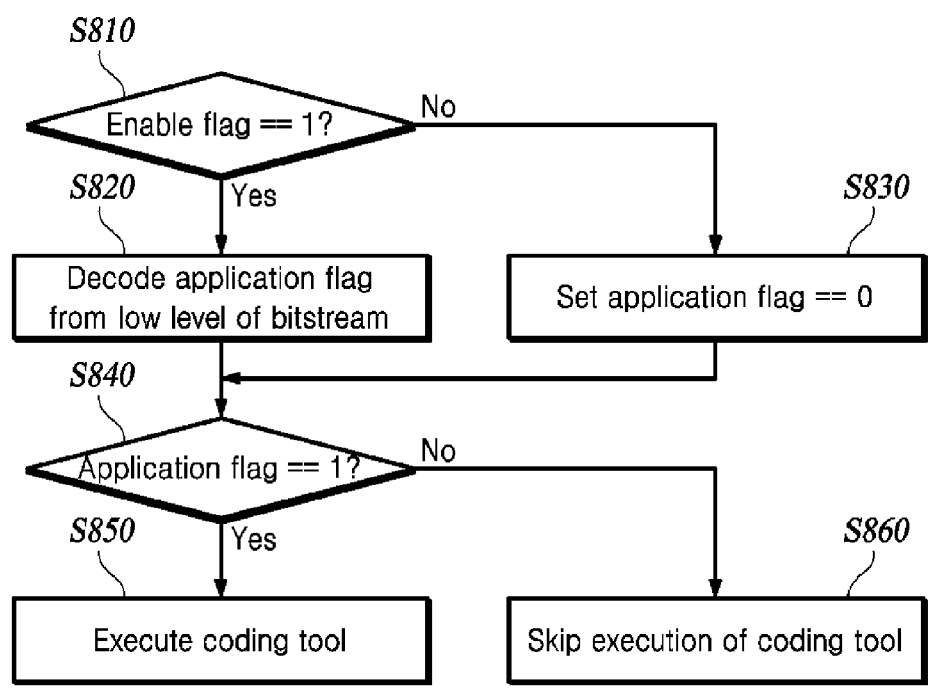

Two examples related to acquisition of the value of the application flag according to the value of the enable flag are shown in FIGS. 7 and 8, respectively. As shown in FIG. 7, the acquisition unit 510 may be configured to determine whether the value of the enable flag is equal to 1 or 0 (S710). When the enable flag is equal to 1, the application flag may not be signaled from the video encoding apparatus, and thus the acquisition unit 510 may be configured to set the application flag to a value (1, a predetermined value) indicating that the target coding tool is applied (S720). In contrast, when the enable flag is equal to 0, the application flag is signaled from the video encoding apparatus, and thus the acquisition unit 510 may be configured to acquire the value by decoding the application flag from the low level of the bitstream (S730).

The execution unit 520 may be configured to determine whether the acquired value of the application flag is equal to 1 or 0 (S740). The execution unit 520 may be configured to execute the target coding tool when the application flag is equal to 1 (S750), and not execute the target coding tool when the application flag is equal to 0 (S760).

As shown in FIG. 8, the acquisition unit 510 may be configured to determine whether the value of the enable flag is equal to 1 or 0 (S810). When the enable flag is equal to 1, the application flag is signaled from the video encoding apparatus, and thus the acquisition unit 510 may be configured to acquire a value by decoding the application flag from a low level of the bitstream (S820). In contrast, when the enable flag is equal to 0, the application flag is not be signaled from the video encoding apparatus, and thus the acquisition unit 510 may be configured to set the application flag to a value (0, a predetermined value) indicating that the target coding tool is not be applied (S830).

The execution unit 520 may be configured to determine whether the acquired value of the application flag is equal to 1 or 0 (S840). The execution unit 520 may be configured to execute the target coding tool when the application flag is equal to 1 (S850), and not execute the target coding tool when the application flag is equal to 0 (S860).

As described above, according to the coding tool control method of the present disclosure, since the signaling of the application flag defined at the low level is determined according to the value of the enable flag defined at the high level, the operation of the target coding tool may be controlled at the high level. Thus, bit efficiency may be improved. In addition, the improvement of bit efficiency may reduce the bit rate required for various contents such as gaming broadcasting, 360-degree video streaming, VR/AR video, and online lectures. As a result, the burden on the network may be reduced, and improvement in energy efficiency of a video playback apparatus (video decoding apparatus) to decode various contents and rapid decoding may be achieved.

Hereinafter, examples of application of the coding tool control method to each of the target coding tools will be described one by one.

Coding Tool Configured to Skip the Transform/Inverse Transform Operation

Transform for residual samples is a technique that transforms the residual samples from the pixel domain to the frequency domain in consideration of the importance of efficient video compression and visual perception, and inverse transform for residual samples is a technique that transforms the residual samples from the frequency domain to the pixel domain.

However, in the case of an unnatural image such as screen content, such transform/inverse transform techniques may be inefficient. In particular, the transform/inverse transform techniques may be skipped (transform skip). When transform/inverse transform of the residual samples is skipped, only scaling (quantization/inverse quantization) may be performed for the residual samples, or only entropy encoding/decoding may be performed without the scaling.

In conventional encoding/decoding method, the size of a transform block is set to 4×4, 8×8, 16×16, or 32×32, and the transform or the transform skip may be applied to the transform blocks. When the transform is applied to a transform block, the video decoding apparatus may be configured to inversely quantize the quantized transform coefficients (TransCoeffLevel[x][y]) and inversely transform the inversely quantized transform coefficients (d[x] [y]) from the frequency domain to the spatial domain to reconstruct the residual samples (r[x] [y]). Additionally, the video decoding apparatus may be configured to shift the reconstructed residual samples according to a bit depth of the image to derive shifted residual samples.

In the conventional encoding/decoding method, the transform skip may be applied to a transform block having a size of 4×4, or may be applied to a transform block having a different size according to an additional syntax element. When the transform skip is applied to the transform block, the video decoding apparatus may be configured to inversely quantize the quantized transform coefficients (TransCoeffLevel[x][y]) and perform a shift operation on the inversely quantized transform coefficients (d[x][y]) to reconstruct the residual samples (r[x][y]). Additionally, the video decoding apparatus may be configured to shift the reconstructed residual samples according to the bit depth of the image to derive shifted residual samples. In particular, the shift operation performed on the inversely quantized transform coefficients is applied instead of the transform technique.

When a flag to indicate whether a rotation technique is applied to the transform-skipped residual samples indicates that the rotation technique is applied, the transform-skipped residual samples may be rotated about 180 degrees. Accordingly, the video decoding apparatus may be configured to scan residual samples in the opposite direction or in the reverse order in consideration of symmetry (rotation).

According to the conventional encoding/decoding method, a syntax element (transform skip flag) indicating whether a transform technique is applied to a transform block is signaled for each transform unit, and accordingly bit efficiency may be degraded. In addition, according to the conventional encoding/decoding method, a syntax element (a presence flag) indicating whether a transform skip flag is present in the transform unit is additionally signaled, and accordingly the bit efficiency may be further degraded.

As described above, when the enable flag (for example, pic_scc_tool_enabled_flag) proposed in the present disclosure is signaled at the high level, signaling of the presence flag as well as signaling of the transform skip flag may be skipped. For example, when the enable flag is equal to 1, the application flag (transform skip flag and presence flag) may not be signaled, and may be implicitly set to 1. When the enable flag is equal to 0, the application flag may be decoded from the low level of the bitstream. As another example, when the enable flag is equal to 1, the application flag may be decoded from the low level of the bitstream. When the enable flag is equal to 0, the application flag may not be signaled, but may be implicitly set to 0. Accordingly, signaling of the application flag may be skipped, thereby improving bit efficiency.

Coding Tool Configured to Selectively Apply Transform Kernels

When a transform technique is applied to the residual samples, the DCT-II transform kernel (transform type) is generally applied to the residual samples. However, to apply a more appropriate transform technique according to various characteristics of the residual samples, a coding tool configured to selectively apply one or two optimal transform kernels from among several transform kernels to the residual samples may be executed.

The transform kernels that may be used in this coding tool are shown in Table 1.

TABLE 1

| Transform Type | Basis function $T_i(j)$, i, j = 0, 1, ..., N − 1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where, $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

Syntax elements of a coding tool configured to selectively apply a transform kernel may be encoded and signaled from a video encoding apparatus to a video decoding apparatus through a block level. When the coding tool is applied, syntax elements (a horizontal flag and a vertical flag) for selecting a transform kernel in a horizontal direction and a transform kernel in a vertical direction may be signaled. A transform kernel applied to the horizontal direction and a transform kernel applied to the vertical direction may be differently selected through the horizontal flag and the vertical flag. Table 2 shows mapping between the application flag, the horizontal flag and the vertical flag.

TABLE 2

| Application flag | Horizontal flag | Vertical flag | Intra/inter | |
|---|---|---|---|---|
| | | | Horizontal | Vertical |
| 0 | | | DCT-II | |
| 1 | 0 | 0 | DST-VII | DST-VII |
| | 0 | 1 | DCT-VIII | DST-VII |
| | 1 | 0 | DST-VII | DCT-VIII |
| | 1 | 1 | DCT-VIII | DCT-VIII |

As described above, when the enable flag proposed in the present disclosure is signaled in the high level, signaling of the application flag, the horizontal flag, and the vertical flag may be skipped if the transform technique is skipped. This is because, when the enable flag is equal to 1, there is a high possibility that the transform technique is skipped within an associated picture.

For example, when the enable flag is equal to 1, the application flag may not be signaled and may be implicitly set to 1. When the enable flag is equal to 0, the application flag may be decoded from the low level of the bitstream. As another example, when the enable flag is equal to 1, the application flag may be decoded from the low level of the bitstream. When the enable flag is equal to 0, the application flag may not be signaled and may be implicitly set to 0. In those two examples, signaling of the horizontal flag and the vertical flag may be skipped when the application flag is equal to 0, but may be signaled when the application flag is equal to 1. Accordingly, signaling of the application flag, the horizontal flag, and the vertical flag may be skipped, thereby improving bit efficiency.

Some exemplary embodiments, in the present disclosure, may further determine whether to skip the transform for DUAL_TREE_CHROMA. Conventionally, in the case of DUAL_TREE_CHROMA, the transform skip is not applied. In the present disclosure, on the other hand, tu_cbf_cb or tu_cbf_cr, which is a cbf flag for the chroma component may be checked. Then, when there is a chroma residual sample and the size of the transform block does not exceed the maximum size allowing the transform skip to be applied, the transform skip method applied to the luma component may be applied to the chroma component.

Coding Tool Configured to Acquire Prediction Information about a Current Block from Another Block Located in a Current Picture In the prior art, a syntax element indicating whether the coding tool is enabled is encoded and signaled at the SPS level, and a syntax element (application flag) indicating whether the current block is encoded by the coding tool is signaled in a block level when the coding tool is enabled.

With the conventional method as described above, the application flag is signaled for every block, and accordingly bit efficiency may be degraded. As described above, when signaling of whether the SCC is used for a unit of a high level including the current block (pic_scc_tool_enabled_flag, enable flag) is performed at the high level, the application flag does not need to be signaled for every block when the SCC is not applied, and therefore the bit efficiency may be improved.

For example, when the enable flag is equal to 1, the application flag may not be signaled and may be implicitly set to 1. When the enable flag is equal to 0, the application flag may be decoded from the low level of the bitstream. As another example, when the enable flag is equal to 1, the application flag may be decoded from the low level of the bitstream. When the enable flag is equal to 0, the application flag may not be signaled and may be implicitly set to 0.

According to an exemplary embodiment, the enable flag may include an enable flag defined in the slice header level and an enable flag (pic_scc_tool_enabled_flag) defined at a relatively higher level than the slice header level. When the enable flag defined at the higher level is equal to 0, the enable flag defined at the slice header level may be encoded, signaled to the video decoding apparatus, and decoded by the video decoding apparatus. In particular, when the enable flag defined at the slice header level is not present in the bitstream, signaling and decoding of the application flag may be skipped.

First Coding Tool

The first coding tool represents the coding tool configured to map prediction samples and scale residual samples using a piece-wise linear model. The first coding tool may be additionally applied to each block before in-loop filtering. The first coding tool may exhibit high compression efficiency for a video having the characteristics of screen content.

Figure 9:
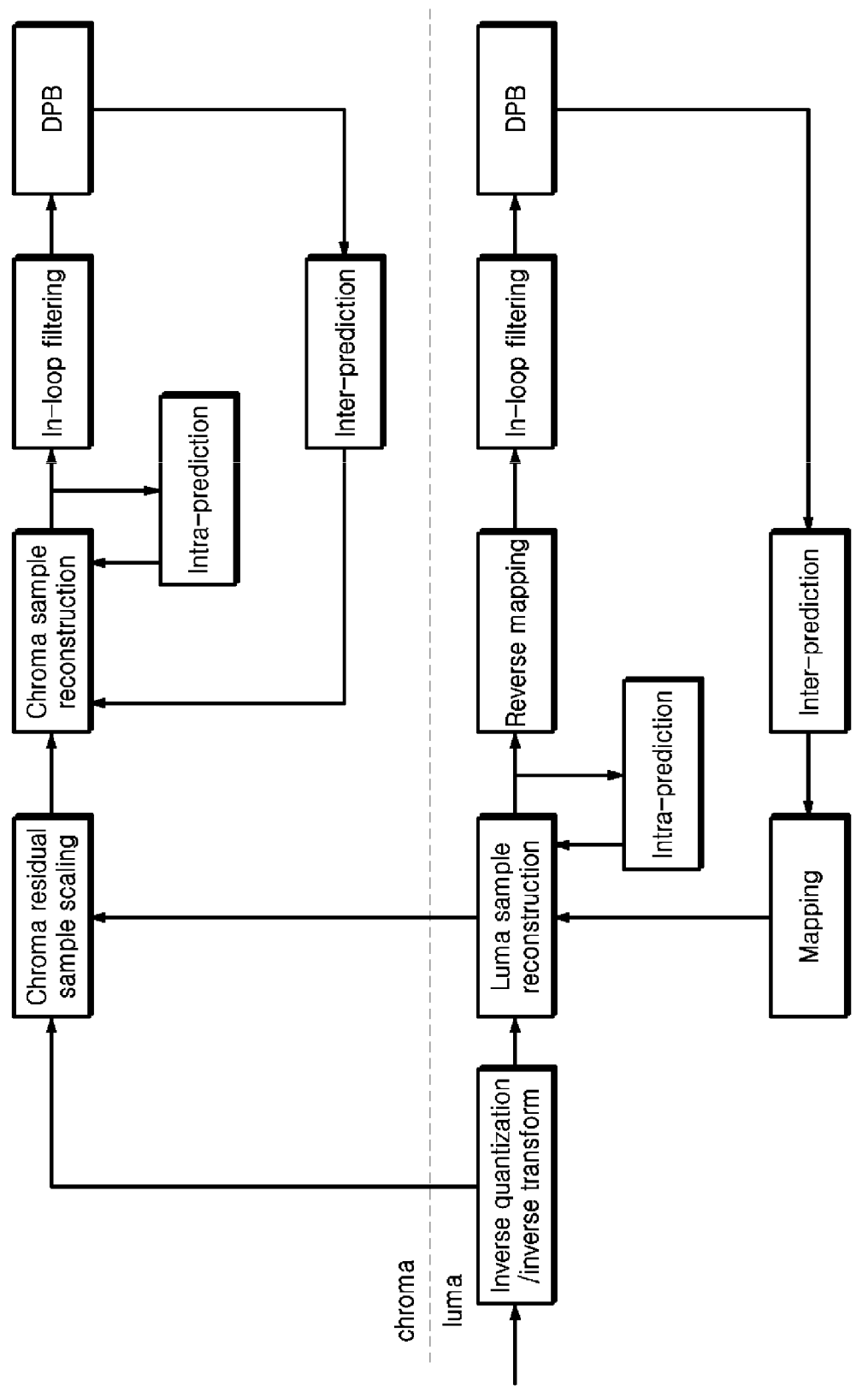
FIG. 9 is an exemplary block diagram illustrating a first coding tool.

FIG. 9 shows an exemplary block diagram illustrating the first coding tool. The first coding tool may include two major operations. One operation is to in-loop mapping luma prediction samples based on the adaptive piecewise linear model, and the other operation is to scale the chroma residual samples according to the value of the luma reconstructed samples. In FIG. 9, inverse quantization/inverse transform, luma sample reconstruction, and intra-prediction of luma are processed within a mapped domain. The first coding tool is applied to the chroma residual sample scaling, mapping, and luma inter prediction. The remaining blocks are functions performed in the original unmapped domain.

Mapping of the luma prediction sample may include an operation of adjusting a dynamic range by redistributing codewords for the luma prediction samples to improve compression efficiency, and an operation of reversely mapping luma reconstructed samples in the mapped domain to an unmapped domain. In particular, the luma reconstructed sample may be derived by summing the mapped luma prediction sample and the luma residual sample, and the luma residual sample is signaled in a mapped domain by the video encoding apparatus.

Whether to enable the first coding tool may be determined based on enable flags defined at two or more levels in the bitstream. One of the enable flags may be signaled at a higher level than the other one. The enable flag signaled at the higher level is referred to "a first enable flag," and the enable flag signaled at the lower level is referred to "a second enable flag".

The first enable flag equal to 1 may indicate that the first coding tool is enabled at the higher level, and the first enable flag equal to 0 may indicate that the first coding tool is not enabled at the higher level. The second enable flag may be encoded and signaled when the first enable flag is equal to 1. The second enable flag equal to 1 indicates that the first coding tool is enabled at the lower level, and the second enable flag equal to 0 may indicate that the first coding tool is not enabled at the lower level.

Whether to apply the first coding tool may be determined based on an application flag (first application flag) defined at a level lower than those of the enable flags in the bitstream. The first application flag may be signaled when the second enable flag is equal to 1 or may be set to a predetermined value (or 1). In another example, the first application flag may be signaled when the second enable flag is equal to 0 or may be set to the predetermined value (or 0).

To determine whether to apply the first coding tool, a method in which the first application flag is encoded, signaled and decoded for every lower level may be undesirable in term of bit efficiency. The present disclosure is directed to improving the bit efficiency of the first coding tool by defining, at the high level of the bitstream, an enable flag (the second enable flag) which indicates whether to enable the first coding tool.

Figure 10:
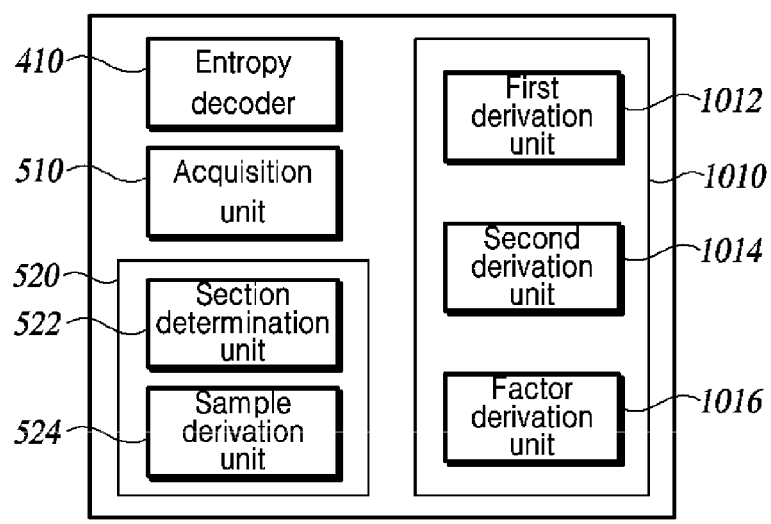
FIG. 10 is an exemplary block diagram of a video decoding apparatus capable of performing a first coding tool.
Figure 11:
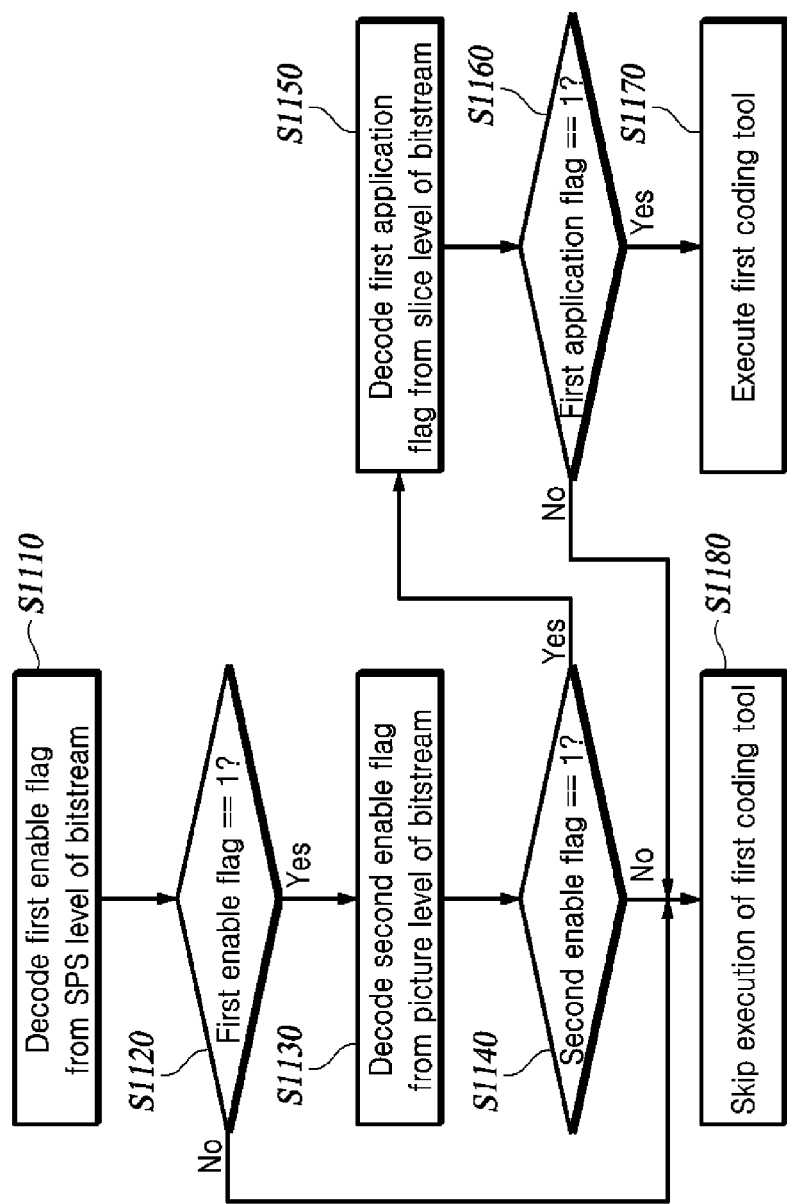
FIG. 11 is a flowchart illustrating an example of a method of controlling execution of a first coding tool is.

FIG. 10 shows an exemplary block diagram of a video decoding apparatus capable of controlling the first coding tool using the second enable flag, and FIG. 11 illustrates an example method of controlling the first coding tool using the second enable flag. As shown in FIG. 10, the video decoding apparatus may include an entropy decoder 410, an acquisition unit 510, an execution unit 520, and a derivation unit 1010. The execution unit 520 may include a section determination unit 522 and a sample derivation unit 524. The derivation unit 1010 may include a first derivation unit 1012, a second derivation unit 1014, and a factor derivation unit 1016.

The video encoding apparatus may be configured to determine whether to enable the first coding tool for a sequence containing a current block, and set a value of the first enable flag in accordance with the determination result. The first enable flag may be encoded and signaled to the video decoding apparatus in the SPS level of the bitstream. In addition, when the first enable flag is equal to 1, the video encoding apparatus may be configured to determine whether the first coding tool is enabled for a picture containing the current block, and set a value of the second enable flag in accordance with the determination result. The second enable flag may be encoded and signaled to the video decoding apparatus in a picture level (including a picture header) of the bitstream.

Further, when the second enable flag is equal to 1, the video encoding apparatus may be configured to determine whether the first coding tool is applied to a slice containing the current block, and set the value of the first application flag in accordance with the determination result. The first application flag may be encoded and signaled to the video decoding apparatus through the slice level (including a slice header) of the bitstream.

The entropy decoder 410 may be configured to decode the first enable flag from the SPS level of the bitstream (S1110), and determine whether to enable the first coding tool based on the value of the first enable flag (S1120). In addition, when the first enable flag is equal to 1, the entropy decoder 410 may be configured to decode the second enable flag from the picture level of the bitstream (S1130), and determine whether to enable the first coding tool based on the value of the second enable flag (S1140).

When the second enable flag is equal to 1, the acquisition unit 510 may be configured to acquire the value of the first application flag by decoding the first application flag from the slice level of the bitstream (S1160). In this example, when the second enable flag is equal to 0, the first application flag may not be signaled and may be implicitly set to 0. In some exemplary embodiments, when the second enable flag is equal to 0, the acquisition unit 510 may be configured to acquire the value of the first application flag by decoding the first application flag from the slice level of the bitstream (S1160). In this example, when the second enable flag is equal to 1, the first application flag may not be signaled and may be implicitly set to 1.

The execution unit 520 may be configured to execute the first coding tool when the first application flag is equal to 1 (S1170), and not execute the first coding tool when the first application flag is equal to 0 (S1180). The first coding tool is also not executed when the first enable flag is equal to 0 in S1120 or the second enable flag is equal to 0 in S1140 (S1180).

Hereinafter, detailed operations performed in the first coding tool will be described.

Luma Prediction Sample Mapping

The piecewise linear model may represent a relationship between the dynamic range of the input signal and the dynamic range of the output signal. The dynamic range of the input signal is divided into a preset number of equal sections, and a piecewise linear model for each section is represented based on the number of codewords allocated to each section. For example, when an input image has a bit depth of 10 bits and the preset number of sections is 16, 64 code words may be basically allocated to each of the 16 sections.

Mapping of a luma prediction sample is a method by which the dynamic range of an inter-predicted luma prediction sample is divided into a preset number of sections, a code word of the luma prediction sample is redistributed by applying the piecewise linear model corresponding to a section which the luma prediction sample belongs to, and thereby the luma prediction sample in a domain (original domain) prior to mapping is mapped to a mapped domain. A luma prediction sample mapped from the luma prediction sample based on the piecewise linear model is a "mapped luma prediction sample." Since intra-prediction is performed within the mapped domain, the mapping is not applied to a block encoded in the intra-mode.

The video encoding apparatus is configured to perform mapping on the luma prediction sample based on the piecewise linear model (generate a mapped luma prediction sample), and encode information on sections (second sections) to which the mapped luma prediction sample may belong and signal the same to the video decoding apparatus.

The information on the second sections may include "index information (section index information) about sections that may be used for the first coding tool among the second sections" and "code word number information." The section index information may include index information about a section having a minimum index and index information about a section having a maximum index among the sections that may be used for the first coding tool. The code word number information may include information (absolute value and sign of the difference) indicating the difference (code word delta) between the number of code words allocated to or included in the original sections (first sections) and the number of code words allocated to each of the second sections that may be used for the first coding tool. Hereinafter, the absolute value of the difference will be referred to as a "code word absolute value," and the sign of the difference will be referred to as a "code word sign."

Figure 12:
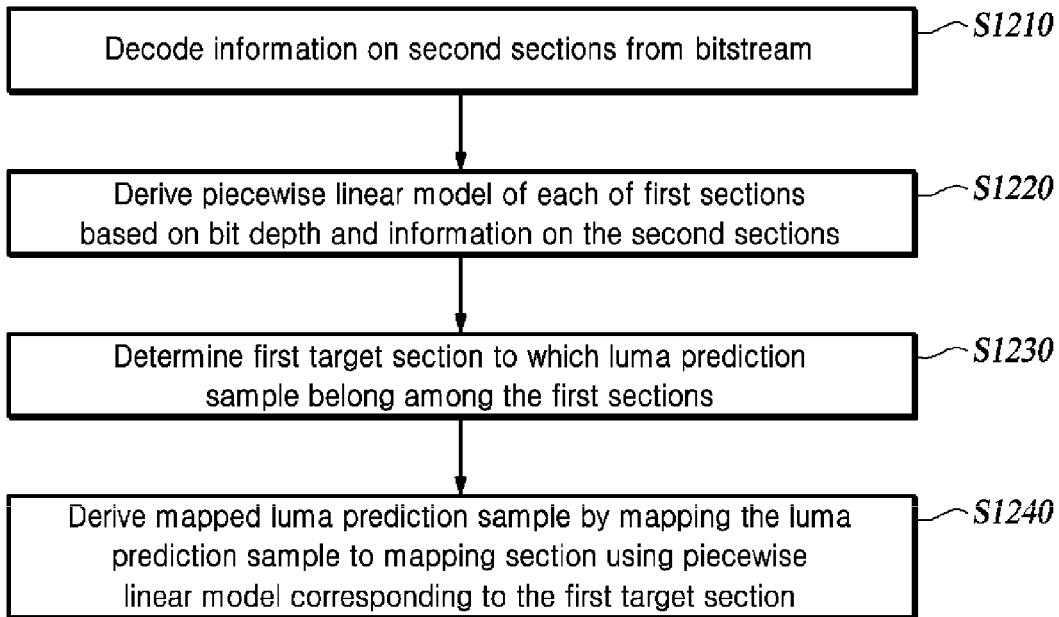
FIG. 12 is a flowchart illustrating an example of a method of deriving a mapped luma prediction sample by a first coding tool.

As shown in FIG. 12, the entropy decoder 410 may be configured to decode information on the second sections from the bitstream (S1210). The derivation unit 1010 may be configured to derive a piecewise linear model of each of the first sections based on the information on the second sections and the bit depth of the image (namely, the mapping relationship between the first sections and the second sections may be derived) (S1220). In particular, the piecewise linear model, that is, the mapping relationship, may include a "scaling factor representing a scaling relationship between the number of code words (number of bits) allocated to each of the first sections and the number of code words (number of bits) allocated to each of the second sections." The scaling factor may represent a relationship between the length of each of the first sections and the length of each of the second sections.

The section determination unit 512 may be configured to determine a section (first target section) to which the luma prediction sample belongs among the first sections, and the sample derivation unit 514 may be configured to derive a mapped luma prediction sample by mapping a luma prediction sample to the mapping section using a piecewise linear model corresponding to the first target section (S1240). In other words, in S1240, the sample derivation unit 514 is configured to derive a mapped luma prediction sample by applying the mapping relationship between the first target section and the mapping section to the luma prediction sample. Particularly, the mapping section may be a section corresponding to the first target section among the second sections. Correspondence between each of the first sections and each of the second sections may be an index assigned to each section or a position of each section in order.

Figure 13:
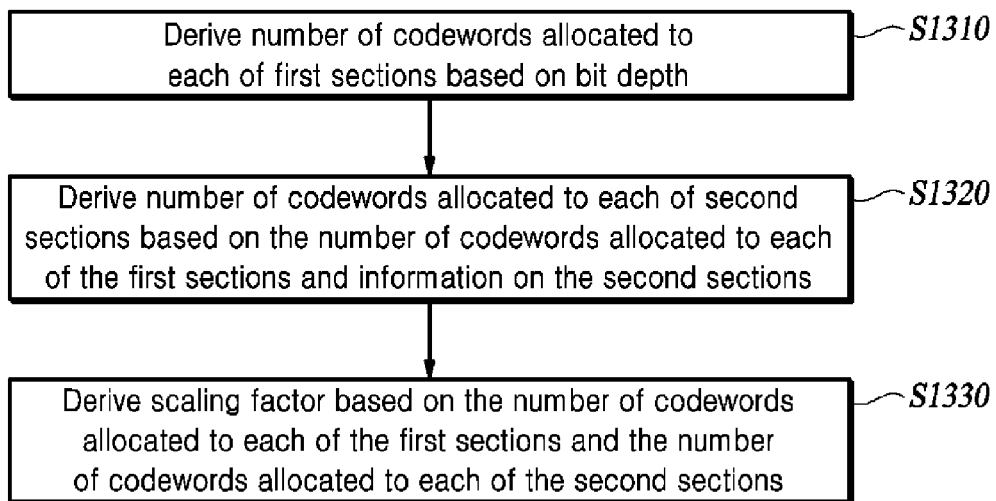
FIG. 13 is a flowchart illustrating an example of a method of deriving a scaling factor by a first coding tool.

FIG. 13 shows an example of a specific method of deriving the scaling factor included in the mapping relationship. The first derivation unit 1012 may be configured to derive the number of code words allocated to each of the first sections based on the bit depth (S1310). As described above, the same number of code words may be allocated to or included in each of the first sections. In other words, the first sections may have the same size.

The second derivation unit 1014 may be configured to derive the number of code words allocated to each of the second sections based on the number of code words allocated to each of the first sections and the information on the second sections (S1320).). Specifically, a code word delta corresponding to a second section may be derived by applying a code word sign to the absolute value of the code word, and the number of code words allocated to the second section may be derived by summing the number of code words allocated to each of the first sections and the code word delta. The factor derivation unit 1016 may be configured to derive a scaling factor base on the number of code words allocated to each of the first sections and the number of code words allocated to each of the second sections (S1330).

Inverse Mapping of Luma Reconstructed Samples

Inverse mapping is an operation of reversely mapping a mapped luma reconstructed sample to the unmapped domain. The mapped luma reconstructed sample may be derived by summing the mapped luma prediction sample and the luma residual sample which is signaled in a mapped domain by the video encoding apparatus.

Figure 14:
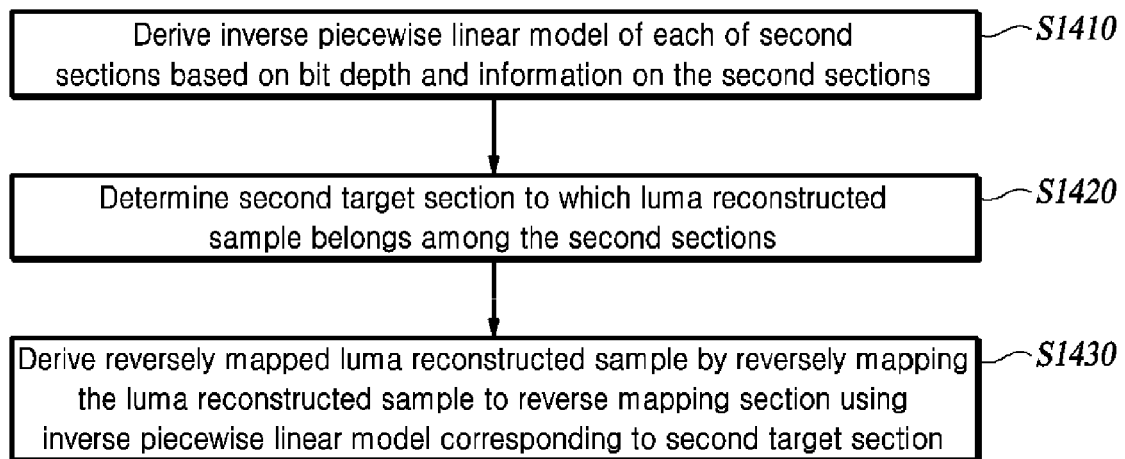
FIG. 14 is a flowchart illustrating an example of a method of deriving an reversely mapped luma reconstruction sample by the first coding tool.

As shown in FIG. 14, the derivation unit 1010 may be configured to derive an inverse piecewise linear model of each of the second sections based on the bit depth and the information on the second sections (i.e., it may derive a reverse mapping relationship between the first sections and the second sections) (S1410). For example, the derivation unit 1010 may be configured to derive an inverse scaling factor based on the number of code words allocated to each of the first sections and the number of code words allocated to each of the second sections. In particular, the inverse scaling factor is a parameter representing the inverse scaling relationship between each of the first sections and each of the second sections, and may be used for defining the inverse piecewise linear model or the reverse mapping relationship.

The inverse piecewise linear model may have a reverse relationship with the piecewise linear model used to map the luma prediction sample. The reverse mapping relationship may have a reverse relationship with the mapping relationship used for the mapping of the luma prediction sample. The section determination unit 522 may be configured to determine a second target section (S1420). The second target section may be a section to which the luma reconstructed sample belongs among the second sections (a section to which the luma reconstructed sample belongs before reverse mapping).

The sample derivation unit 524 may be configured to reversely map the luma reconstructed sample to a reverse mapping section using an inverse piecewise linear model corresponding to the second target section, thereby deriving or generating an reversely mapped luma reconstructed sample (S1430). In other words, the sample derivation unit 524 may be configured to apply the reverse mapping relationship between the second target sections and the reverse mapping section to the luma reconstructed sample (reversely map the luma reconstructed sample) to derive the reversely mapped luma reconstructed sample. Particularly, the reverse mapping section may be a section to which the reversely mapped luma reconstructed sample belongs among the first sections or a section corresponding to the second target section. Correspondence between each of the first sections and each of the second sections may be an index allocated to each section or a position of each section in order.

Chroma Residual Sample Scaling

Scaling of chroma residual samples refers to a method of scaling chroma residual samples according to values of luma reconstructed samples. Scaling of the chroma residual samples may be performed when the first application flag is equal to 1 or the chroma flag is equal to 1, which will be described below. In addition, scaling of the chroma residual samples may be performed when the size of the chroma residual samples (chroma residual block) exceeds a preset value (e.g., 4).

The video encoding apparatus may be configured to determine whether to perform scaling on the chroma residual samples of the current block, and set a value of the chroma flag in accordance with the determination result. The chroma flag may indicate whether scaling of chroma residual samples is enabled for and/or applied to a current picture containing the current block. The chroma flag equal to 1 indicates that the scaling of the chroma residual samples is enabled and/or applied, and the chroma flag equal to 0 may indicate that the scaling of the chroma residual samples is not enabled and/or not applied. When the second enable flag is equal to 1, the chroma flag may be encoded and signaled to the video decoding apparatus at the picture level or slice level of a bitstream.

Figure 15:
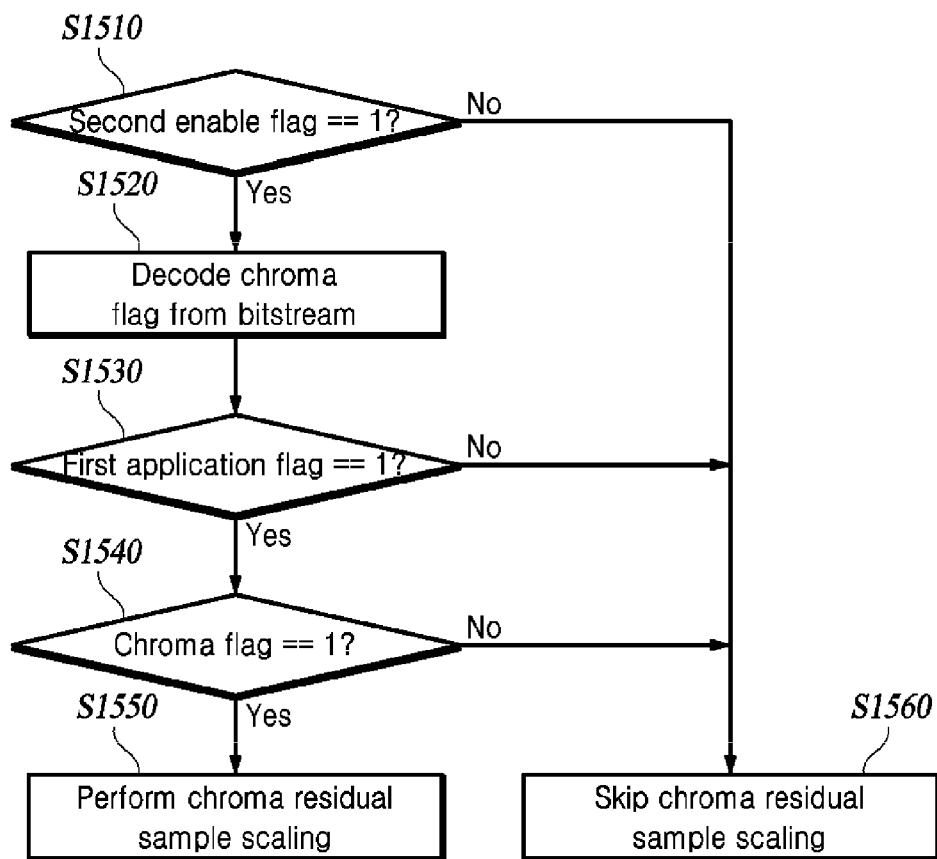
FIG. 15 is a flowchart illustrating an example of a method of determining whether to scale chroma residual samples by the first coding tool.
Figure 16:
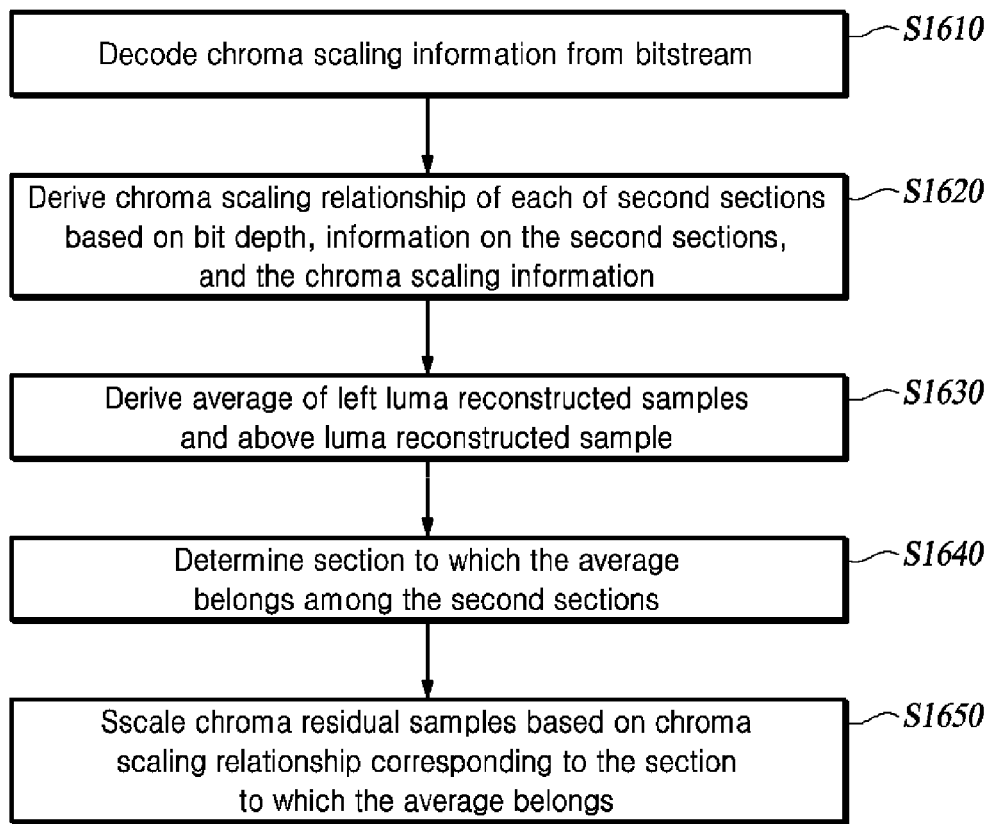
FIG. 16 is a flowchart illustrating an example of a method of scaling chroma residual samples by the first coding tool.
Figure 17:
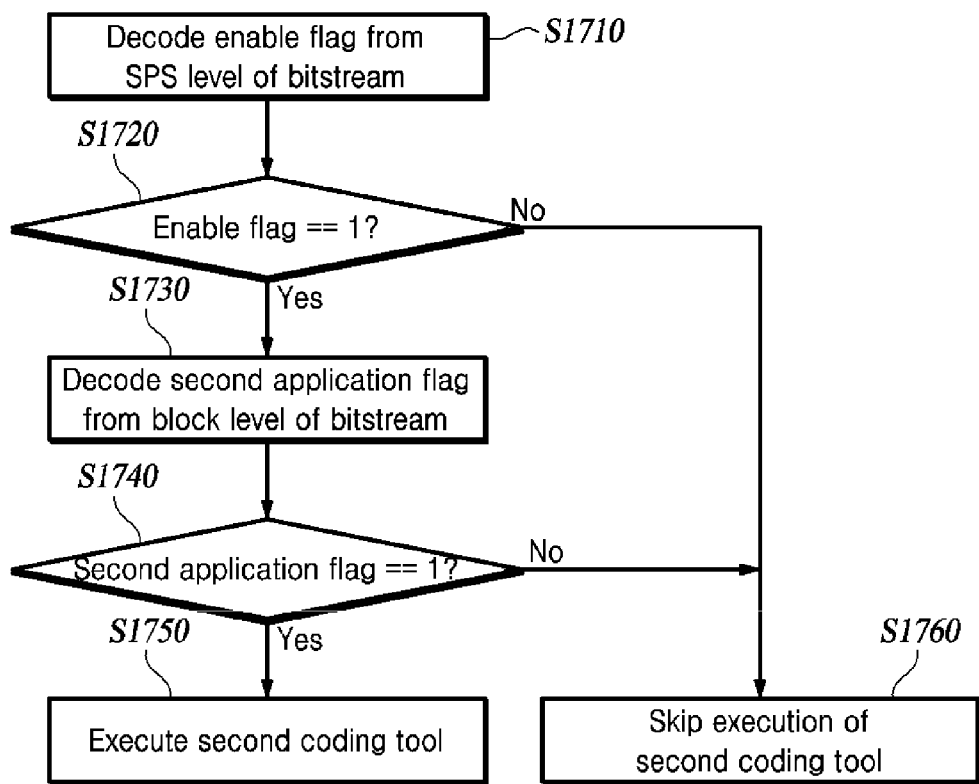
FIG. 17 is a flowchart illustrating an example of a method of controlling execution of a second coding tool.

As shown in FIG. 15, when the second enable flag is equal to 1 (S1510), the entropy decoder 410 may be configured to decode the chroma flag from the picture level of the bitstream (S1520). When the application flag is equal to 1 (S1530) and the chroma flag is equal to 1 (S1540), the execution unit 520 may be configured to derive scaled chroma residual samples by performing scaling on the chroma residual samples (S1550). Scaling of the chroma residual samples may be performed using chroma scaling information decoded from the bitstream.

The chroma scaling information, which is information for compensating for the correlation between the luma component and the chroma components, is provided to adjust the dynamic range of the second sections used for mapping of the luma prediction sample to be suitable for scaling of the chroma residual samples. When the second enable flag is equal to 0 in operation S1510, the application flag is equal to 0 in S1530, or the chroma flag is equal to 0 in S1540, scaling of the chroma residual samples may be skipped (S1560).

The video encoding apparatus may be configured to perform scaling on chroma residual samples, and derive a difference between the number of codewords included in each of the second sections before the scaling and the number of codewords included in each of the second sections after the scaling. In addition, the video encoding apparatus may be configured to encode information (chroma scaling information) on the derivation result (difference value) and signal the same to the video decoding apparatus. The chroma scaling information may include a delta chroma code word size, which is a magnitude of the difference value, and a delta chroma code word sign, which is a sign of the difference value.

The entropy decoder 410 may be configured to decode the chroma scaling information from the bitstream (S1610). The derivation unit 1010 may be configured to derive a scaling relationship based on the bit depth, information on the second sections, and the chroma scaling information (S1620). For example, the derivation unit 1010 may be configured to derive a delta chroma code word (a difference between the number of codewords included in each of the second sections and the number of code words included in each of third sections) based on the delta chroma code word size and the delta chroma code word sign, and adjust the dynamic range of the second sections by summing the number of code words included in each of the second sections and the delta chroma code word, thereby deriving the chroma scaling relationship between the second sections.

The chroma scaling relationship derived by the derivation unit 1010 may have a reverse relationship to the chroma scaling relationship used for scaling of the chroma residual samples by the video encoding apparatus. Accordingly, the chroma scaling relationship derived by the derivation unit 1010 may be a reverse chroma scaling relationship. The section determination unit 522 may be configured to derive an average of the luma reconstructed samples positioned on the left of the chroma residual samples (current block) and the luma reconstructed samples positioned above the chroma residual samples (current block) (S1630), and determine a section to which the average belongs among the second sections (S1640). The sample derivation unit 524 may be configured to generate or derive the scaled chroma residual samples by scaling the chroma residual samples based on the chroma scaling relationship corresponding to the section to which the average belongs (S1650).

Second Coding Tool

The second coding tool is a coding tool configured to apply differential coding to residual samples to improve compression performance of residual samples to which the transform skip mode is applied. When a transform unit (TU) is encoded in the transform skip mode for lossy compression, the differential coding technique may be applied to the residual samples after intra prediction and inter prediction. In the transform skip mode, the differential coding technique may provide more improved compression performance by reducing the total amount of energy of the residual components for entropy coding.

In horizontal differential coding, a current sample is predicted using a residual sample of the nearest left column in the horizontal direction among samples encoded by the video encoding apparatus. After applying the horizontal differential coding to the residual samples of an M×N block, the residual samples (where 0≤i<M, and i is a natural number) may be expressed by Equation 1. In other words, the residual sample at position (i, j) is modified through subtraction with a residual sample at position (i, j−1).

$$\tilde{r}_{i,j} = \begin{cases} Q(r_{i,j}), & i = 0, 0 \le j \le (N-1) \\ Q(r_{i,j}) - Q(r_{(i-1),j}), & 1 \le i \le (M-1), 0 \le j \le (N-1) \end{cases} \quad \text{Equation 1}$$

In Equation 1, (i, j) denotes the i-th row and j-th column, $Q(r_{i,j})$ denotes a residual sample at position (i, j), and $\tilde{r}_{i,j}$ denotes a modified residual sample.

As shown in Equation 1, in the horizontal differential coding, the video encoding apparatus entropy-encodes the modified residual sample and then transmits the same to the video decoding apparatus. The sample is reconstructed and reserved for prediction of a residual sample in the next column. The horizontal prediction operation may be sequentially performed on all columns of the block.

In the vertical differential coding, a current sample is predicted using a residual sample of the nearest upper row in a vertical direction among the residual samples encoded by the video encoding apparatus. After applying the vertical differential coding to the residual samples of an M×N block, the residual samples (where 0≤j<N, and j is a natural number) may be expressed by Equation 2.

$$\tilde{r}_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases} \quad \text{Equation 2}$$

As shown in Equation 2, in the vertical differential coding, the video encoding apparatus entropy-encodes the modified residual sample and then transmits the same to the video decoding apparatus. The sample is reconstructed and reserved for prediction of a residual sample in the next row. The vertical prediction operation may be sequentially performed on all rows of the block.

When the horizontal differential coding is applied, the video decoding apparatus is configured to reconstruct the residual samples as shown in Equation 3. In other words, the residual samples in the residual block reconstructed from the bitstream by the video decoding apparatus are modified according to the horizontal differential coding. A target residual sample to be modified in the reconstructed residual block is modified in such a manner that left residual samples positioned on the left of the target residual sample in the same row as the target residual sample are added to the target residual sample.

$$Q(r_{i,j}) = \sum_{k=0}^{j} Q(\tilde{r}_{i,k}), 0 \le j \le N \quad \text{Equation 3}$$

The video decoding apparatus may be configured to reconstruct the residual samples of the j-th column by sequentially adding the reconstructed residual samples. The horizontal reconstruction operation may be sequentially performed on all columns of the block.

When the vertical differential coding is applied, the video decoding apparatus reconstructs the residual samples as shown in Equation 4. In other words, the residual samples in the residual block reconstructed from the bitstream by the video decoding apparatus are modified according to the vertical differential coding. A target residual sample to be modified in the reconstructed residual block is modified in such a manner that left residual samples positioned above the target residual sample in the same column as the target residual sample are added to the target residual sample.

$$Q(r_{i,j}) = \sum_{k=0}^{i} Q(\tilde{r}_{k,j}), 0 \le i \le N \quad \text{Equation 4}$$

The video decoding apparatus may be configured to reconstruct the residual samples of the i-th row by sequentially adding the reconstructed residual samples. The vertical reconstruction operation may be sequentially performed on all rows of the block. Whether to execute the second coding tool may be determined by the second application flag defined at the block level. However, with the conventional method, bit efficiency may be degraded because the second application flag is encoded, signaled and decoded on a block-by-block basis.

As described above, since the second coding tool is applied to the transform-skipped residual samples, it may be applied with a high probability to a video having characteristics of screen content. Therefore, focusing on these characteristics, the present disclosure is intended to define, at a level higher than the block level, an enable flag indicating whether the second coding tool is enabled (or whether the video corresponds to the screen content), and control whether to signal the second application flag according to the value of the enable flag to improve bit efficiency.

The video encoding apparatus may be configured to determine whether the second coding tool is enabled (whether the video corresponds to the screen content) and set a value of the enable flag in accordance with the determination result. In addition, the video encoding apparatus may be configured to encode the enable flag and signal the same to the video decoding apparatus in a high level (e.g., SPS level) of the bitstream. The video decoding apparatus may be configured to decode the enable flag from the high level of the bitstream (S1710), and determine whether the value of the decoded enable flag is equal to 1 or 0 (S1720).

The video encoding apparatus may be configured to determine whether the second coding tool is applied to the current block, and determine whether to signal the second application flag based on the value of the enable flag. For example, the video encoding apparatus may be configured to encode the second application flag and signal the same to the video decoding apparatus when the enable flag is equal to 1, and not signal the second application flag when the enable flag is equal to 0. In particular, the video decoding apparatus may be configured to decode the second application flag from the bitstream when the enable flag is equal to 1 since the second application flag is signaled (S1730), and not decode the second application flag when the enable flag is equal to 0 since the second application flag is not signaled. When the second application flag is not decoded, the second application flag may be set to a value (of 0) implicitly indicating that the second coding tool is not applied.

As another example, the video encoding apparatus may not signal the second application flag when the enable flag is equal to 1, and may be configured to signal the second application flag when the enable flag is equal to 0. In particular, the video decoding apparatus may be configured to decode the second application flag from the bitstream when the enable flag is equal to 0 since the second application flag is signaled, and may not decode the second application flag when the enable flag is equal to 1 because the second application flag is not signaled. When the second application flag is not decoded, the second application flag may be set to a value (of 1) implicitly indicating that the second coding tool is applied.

The video decoding apparatus may be configured to determine the value of the decoded or set second application flag is equal to 1 or 0 (S1740), execute the second coding tool when the second application flag is equal to 1 (S1750), and not execute the second coding tool when the second application flag is equal to 0 (S1760). According to an exemplary embodiment, the enable flag may include pic_scc_tool_enabled_flag indicating whether the image corresponds to the screen content, and a flag (slice flag) indicating whether the second coding tool is enabled on a slice-by-slice basis.

When the current image corresponds to the screen content (pic_scc_tool_enabled_flag is equal to 1), the slice flag may be encoded and signaled from the video encoding apparatus to the image decoding device, and decoded by the video decoding apparatus. In particular, whether to signal and decode the second application flag may be determined according to the value of the slice flag.

For example, the video encoding apparatus may be configured to encode the second application flag and signal the same to the video decoding apparatus when the slice flag is equal to 1, and not signal the second application flag when the slice flag is equal to 0. In particular, the video decoding apparatus may be configured to decode the second application flag from the bitstream when the slice flag is equal to 1 since the second application flag is signaled (S1730), and not decode the second application flag when the slice flag is equal to 0 since the second application flag is not signaled. When the second application flag is not decoded, the value of the second application flag may be set to a value (of 0) implicitly indicating that the second coding tool is not applied.

As another example, the video encoding apparatus may not signal the second application flag when the slice flag is equal to 1, and may signal the second application flag when the slice flag is equal to 0. In particular, the video decoding apparatus may be configured to decode the second application flag from the bitstream when the slice flag is equal to 0 because the second application flag is signaled, and not decode the second application flag when the slice flag is equal to 1 because the second application flag is not signaled. When the second application flag is not decoded, the second application flag may be set to a value (of 1) implicitly indicating that the second coding tool is applied.

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the exemplary embodiments is not limited by the exemplary embodiments explicitly described above but is inclusive of the claims and equivalents thereto.

What is claimed is:

1. A video decoding apparatus, comprising:
an entropy decoder configured to:
decode, from a sequence parameter set (SPS) level of a bitstream, a first enable flag indicating whether one or more coding tools are enabled, the one or more coding tools including a first coding tool configured to encode a sample value using luma component mapping based on a piecewise linear model, and
decode, from a picture level of the bitstream, a second enable flag indicating whether the first coding tool is enabled for a current picture, when the first enable flag indicates that the first coding tool is enabled;
an acquisition unit configured to acquire a value of an application flag indicating whether to apply the first coding tool for a current slice partitioned from the current picture, by, according to a value of the second enable flag, either setting the application flag to a predetermined value or decoding the application flag from a slice level of the bitstream; and
a processor configured to execute the first coding tool depending on the value of the application flag,
wherein, when the first coding tool is executed, the processor is configured to:
generate a mapped luma prediction sample from a luma prediction sample based on a piecewise linear model corresponding to the luma prediction sample;

generate a luma reconstructed sample by adding a luma residual sample reconstructed from the bitstream and the mapped luma prediction sample; and reversely map the luma reconstructed sample using an inverse piecewise linear model having an inverse relationship with the piecewise linear model, wherein the processor is configured to generate the mapped luma prediction sample by performing a process comprising:

deriving piecewise linear models respectively corresponding to first sections to which the luma prediction sample is allowed to belong, based on a bit depth and information on second sections onto which the mapped luma prediction sample is allowed to belong, the information on the second sections decoded from the bitstream, and deriving the mapped luma prediction sample, by determining a first target section to which the luma prediction sample belongs among the first sections and mapping the luma prediction sample to a mapping section using a piecewise linear model corresponding to the first target section, the mapping section being a section among the second sections which corresponds to the first target section, wherein the processor is further configured to perform a chroma scaling process comprising:

deriving chroma scaling relationships respectively corresponding to the second sections, based on the information on the second sections and chroma scaling information decoded from the bitstream, determining, among the second sections, a section to which an average of luma reconstructed samples positioned on above and left sides of a current block belong, and scaling chroma residual samples using a chroma scaling relationship corresponding to the section to which the average belongs, to thereby reconstruct chroma samples using the scaled chroma residual samples and chroma prediction samples.

2. The apparatus of claim 1, wherein each of the piecewise linear models includes a scaling factor indicating a scaling relationship between a number of code words allocated to each of the first sections and a number of code words allocated to each of the second sections, wherein the processor is configured to:

derive the number of code words allocated to each of the first sections based on the bit depth;

derive the number of code words allocated to each of the second sections based on the number of code words allocated to each of the first sections and the information on the second sections; and derive the scaling factor corresponding to each of the piecewise linear models, based on the number of code words allocated to each of the first sections and the number of code words allocated to each of the second sections.

3. The apparatus of claim 1, wherein, the processor is configured to:

derive inverse piecewise linear models respectively corresponding to the second sections based on the bit depth and the information on the second sections, determine a second target section to which the luma reconstructed sample belongs among the second sections, and derive a reversely mapped luma reconstructed sample by reversely mapping the luma reconstructed sample to an reverse mapping section using an inverse piecewise linear model corresponding to the second target section, the reverse mapping section being a section corresponding to the second target section among the first sections.

4. The apparatus of claim 1, wherein the entropy decoder is configured to decode, from a picture level of the bitstream, a chroma flag indicating whether the chroma scaling process is enabled when the second enable flag indicates that the first coding tool is enabled, and wherein the processor is configured to perform the chroma scaling process according to a value of the chroma flag.

5. The apparatus of claim 1, wherein the one or more coding tools further include a second coding tool configured to apply differential coding to residual samples of the current block.

6. A non-transitory computer readable medium storing a bitstream containing encoded video data, the bitstream being decoded by a process comprising:

decoding, from a sequence parameter set (SPS) level of a bitstream, a first enable flag indicating whether one or more coding tools are enabled, the one or more coding tools including a first coding tool configured to encode sample values using luma component mapping based on a piecewise linear model;

decoding, from a picture level of the bitstream, a second enable flag indicating whether the first coding tool is enabled for a current picture, when the first enable flag indicates that the first coding tool is enabled;

acquiring a value of an application flag indicating whether to apply the first coding tool for a current slice partitioned from the current picture, by decoding the application flag from a slice level of the bitstream when the second enable flag indicates that the first coding tool is enabled, wherein the application flag is set to a predetermined value when the second enable flag does not indicate that the first coding tool is enabled; and depending on the value of the application flag, executing the first coding tool, wherein the executing of the first coding tool comprises:

generating a mapped luma prediction sample from a luma prediction sample, based on a piecewise linear model corresponding to the luma prediction sample, and generating a luma reconstructed sample by adding a luma residual sample reconstructed from the bitstream and the mapped luma prediction sample;

reversely mapping the luma reconstructed sample using an inverse piecewise linear model having an inverse relationship with the piecewise linear model; and scaling chroma residual samples based on chroma scaling information decoded from the bitstream to reconstruct chroma samples using the scaled chroma residual samples and chroma prediction samples, wherein the generation of the mapped luma prediction sample comprises:

decoding, from the bitstream, information on second sections onto which the mapped luma prediction sample is allowed to belong;

deriving piecewise linear models respectively corresponding to first sections to which the luma prediction sample is allowed to belong, based on a bit depth and the information on the second sections; and deriving the mapped luma prediction sample, by determining a first target section to which the luma prediction sample belongs among the first sections and mapping the luma prediction sample to a mapping section using a piecewise linear model corresponding to the first target section, the mapping section being a section corresponding to the first target section among the second sections, wherein the scaling of the chroma residual samples comprises:

deriving chroma scaling relationships respectively corresponding to the second sections, based on the information on the second sections and the chroma scaling information;

determining, among the second sections, a section to which an average of luma reconstructed samples positioned on above and left sides of a current block belong; and scaling the chroma residual samples using a chroma scaling relationship corresponding to the section to which the average belongs.

* * * * *